United States Patent
Shafer et al.

(10) Patent No.: US 10,268,931 B2
(45) Date of Patent: Apr. 23, 2019

(54) SPATIOTEMPORAL METHOD FOR ANOMALY DETECTION IN DICTIONARY LEARNING AND SPARSE SIGNAL RECOGNITION

(71) Applicant: SPAWAR Systems Center Pacific, San Diego, CA (US)

(72) Inventors: Scott Allen Shafer, San Diego, CA (US); Pedro Andres Forero, San Diego, CA (US); Joshua David Harguess, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/472,833

(22) Filed: Mar. 29, 2017

(65) Prior Publication Data
US 2017/0286811 A1 Oct. 5, 2017

Related U.S. Application Data

(60) Provisional application No. 62/315,580, filed on Mar. 30, 2016.

(51) Int. Cl.
G06K 9/62 (2006.01)
G06K 9/66 (2006.01)
G06F 17/27 (2006.01)
G10L 15/06 (2013.01)

(52) U.S. Cl.
CPC .......... G06K 9/66 (2013.01); G06F 17/2735 (2013.01); G06K 9/6296 (2013.01); G10L 15/063 (2013.01); G10L 2015/0631 (2013.01)

(58) Field of Classification Search
CPC .... G06K 9/66; G06K 9/6296; G06F 17/2735; G10L 15/063; G10L 2015/0631
See application file for complete search history.

(56) References Cited

PUBLICATIONS

I. Tosic and P. Frossard, "Dictionary learning," IEEE Signal Process. Mag., vol. 28, No. 2, pp. 27-38, Mar. 2011 (Year: 2011).*

(Continued)

*Primary Examiner* — Menatoallah Youssef
(74) *Attorney, Agent, or Firm* — SPAWAR Systems Center Pacific; Kyle Eppele; J. Eric Anderson

(57) ABSTRACT

A method for constructing a dictionary to represent data from a training data set comprising: modeling the data as a linear combination of columns; modeling outliers in the data set via deterministic outlier vectors; formatting the training data set in matrix form for processing; defining an underlying structure in the data set; quantifying a similarity across the data; building a Laplacian matrix; using group-Lasso regularizers to succinctly represent the data; choosing scalar parameters for controlling the number of dictionary columns used to represent the data and the number of elements of the training data set identified as outliers; using BCD and PG methods on the vector-matrix-formatted data set to estimate a dictionary, corresponding expansion coefficients, and the outlier vectors; and using a length of the outlier vectors to identify outliers in the data.

15 Claims, 7 Drawing Sheets

(56) References Cited

PUBLICATIONS

Forero, Pedro A., Scott Shafer, and Josh Harguess. "Structured outlier models for robust dictionary learning." Information Sciences and Systems (CISS), 2015 49th Annual Conference on. IEEE, 2015. (Year: 2015).*

Forero, Pedro A., and Georgios B. Giannakis. "Sparsity-exploiting robust multidimensional scaling." IEEE Transactions on Signal Processing 60.8 (2012): 4118-4134. (Year: 2012).*

A. Beck & M. Teboulle, "A fast iterative shrinkage-thresholding algorithm for linear inverse problems," SIAM Journal on Imaging Sciences,vol. 2, No. 1, pp. 183-202, 2009.

Z. Chen and Y. Wu, "Robust dictionary learning by error source decomposition," in Proc. of IEEE International Conference on Computer Vision, Dec. 1-8, Sydney, Australia 2013, pp. 2216-2223.

P. A. Forero and G. B. Giannakis, "Sparsity-exploiting robust multidimensional scaling," IEEE Transactions on Signal Processing, vol. 60, No. 8, pp. 4118-4134, Aug. 2012.

J. J. Hull, "A database for handwritten text recognition research," IEEE Transactions on Pattern Analysis and Machine Intelligence, vol. 16, No. 5, pp. 550-554, May 1994.

W. Li, V. Mahadevan, and N. Vasconcelos, "Anomaly detection and localization in crowded scenes," IEEE Transactions on Pattern Analysis and Machine Intelligence, vol. 36, No. 1, pp. 18-32, Jan. 2014.

V. Mahadevan, W. Li, V. Bhalodia, and N. Vasconcelos, "Anomaly detection in crowded scenes," in Proc. of IEEE Conference on Computer Vision and Pattern Recognition, Jun. 13-18, San Francisco, CA, United States 2010, pp. 1975-1981.

G. Mateos and G. B. Giannakis, "Robust nonparametric regression via sparsity control with application to load curve data cleansing," IEEE Transactions on Signal Processing, vol. 60, No. 4, pp. 1571-1584, Apr. 2012.

G. Mateos and G. B. Giannakis, "Robust PCA as bilinear decomposition with outlier-sparsity regularization," IEEE Transactions on Signal Processing, vol. 60, No. 10, pp. 5176-5190, Oct. 2012.

B. A. Olshausen and D. J. Field, "Sparse coding with an overcomplete basis set: A strategy employed by V1?" Vision Research, vol. 37, No. 23, pp. 3311-3325, 1997.

Q. Pan, D. Kong, C. Ding, and B. Luo, "Robust non-negative dictionary learning," in Proc of 28th AAAI Conference on Artificial Intelligence, Jul. 27-31, 2014, Quebec, Canada 2014.

N. Parikh and S. Boyd, "Proximal algorithms," Found. Trends Optimization, vol. 1, pp. 123-231, 2013.

R. Tibshirani, "Regression shrinkage and selection via the lasso," Journal of the Royal Statistical Society. Series B 'Methodological), vol. 58, No. 1, pp. 267-288, 1996.

I. Tosic and P. Frossard, "Dictionary learning," IEEE Signal Process. Mag., vol. 28, No. 2, pp. 27-38, Mar. 2011.

N. Wang, J. Wang, and D.-Y. Yeung, "Online robust non-negative dictionary learning for visual tracking," in Proc. of IEEE International Conference on Computer Vision, Dec. 1-8, Sydney, Australia 2013, pp. 657-664.

A. M. Zoubir, V. Koivunen, Y. Chakhchoukh, and M. Muma, "Robust estimation in signal processing: A tutorial-style treatment of fundamental concepts," IEEE Signal Processing Magazine, vol. 29, No. 4, pp. 61-80, Jul. 2012.

Forero, Pedro A. et al.; Structured Outlier Models for Robust Dictionary Learning; Conference Presentation; 49th Annual Conference of Information Sciences and Systems; presented at Johns Hopkins University, Baltimore, MD Mar. 18-20, 2015.

* cited by examiner

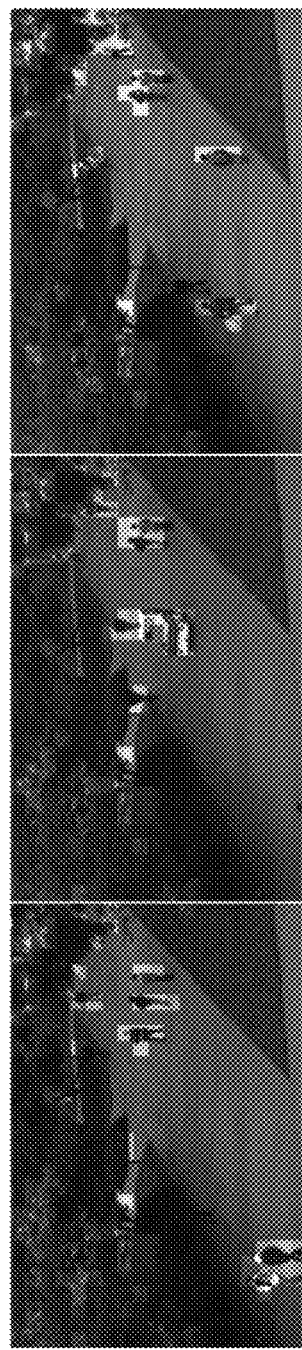
Fig. 5A  Fig. 5B  Fig. 5C  Fig. 5D  Fig. 5E  Fig. 5F

SPATIOTEMPORAL METHOD FOR ANOMALY DETECTION IN DICTIONARY LEARNING AND SPARSE SIGNAL RECOGNITION

CROSS-REFERENCE TO RELATED APPLICATION

This application claims the benefit of U.S. Provisional Application No. 62/315,580, filed 30 Mar. 2016, titled "Spatiotemporal Methods for Anomaly Detection in Dictionary Learning and Sparse Regression".

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil.

BACKGROUND OF THE INVENTION

Succinct representations of data (especially high-dimensional data) are paramount to promptly extract actionable information and reduce the storage and communication requirements related to sharing and archiving data. A fundamental observation, first made in the image processing community, is that a more efficient signal representation is possible if one uses an over-complete dictionary learned from the signals themselves rather than a fixed basis. Given a large number of signal samples, the dictionary learning problem aims to construct a dictionary that can be used to efficiently represent the data as a linear combination of its columns, also known as atoms. In this context, a more efficient data representation is one that uses a smaller number of atoms to achieve the desired signal reconstruction quality.

Usually, the dictionary is learned by fitting training data to a linear model representation for the data via a regularized least-squares criterion, where regularization is used to encourage a sparse structure in the vectors of regression coefficients. Naturally, the data samples used for learning the dictionary are assumed to adhere to the nominal process that generated the data. However, in many cases it is not possible to screen all data samples to guarantee that no datum behaves as an outlier, that is, deviates significantly from the remaining data. A new method is needed for robust dictionary learning.

SUMMARY

Disclosed herein is a method for constructing a dictionary to succinctly represent data from a training data set that comprises the following steps. The first step provides for modeling the data as a linear combination of columns of the dictionary. The next step provides for modeling a presence of outliers in the data set via deterministic outlier vectors that will take nonzero values for data vectors that are deemed outliers only. The next step provides for formatting the training data set in matrix form for processing. The next step provides for defining an underlying structure in the data set. The next step provides for quantifying a similarity across the data according to the underlying structure. The next step provides for building a Laplacian matrix from the matrix-formatted data set. The underlying data structure is captured within the Laplacian matrix. The next step provides for using Lasso and group-Lasso regularizers to succinctly represent the data as a linear combination of columns of the dictionary. The next step provides for choosing scalar parameters for controlling the number of dictionary columns used to represent the data and the number of elements of the training data set identified as outliers. The next step provides for using block coordinate descent and proximal gradient methods on the vector-matrix-formatted data set to estimate a dictionary that efficiently represents each datum in the training data set as a linear combination of a subset of dictionary columns, corresponding expansion coefficients, and the outlier vectors. The next step provides for using a length of the outlier vectors to identify outliers in the data.

BRIEF DESCRIPTION OF THE DRAWINGS

Throughout the several views, like elements are referenced using like references. The elements in the figures are not drawn to scale and some dimensions are exaggerated for clarity.

FIGS. 5A-5F are images of a walkway highlighting discovered anomalies.

DETAILED DESCRIPTION OF EMBODIMENTS

The disclosed methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods described herein as will be understood by one of ordinary skill in the art unless otherwise stated specifically.

Figure 1:
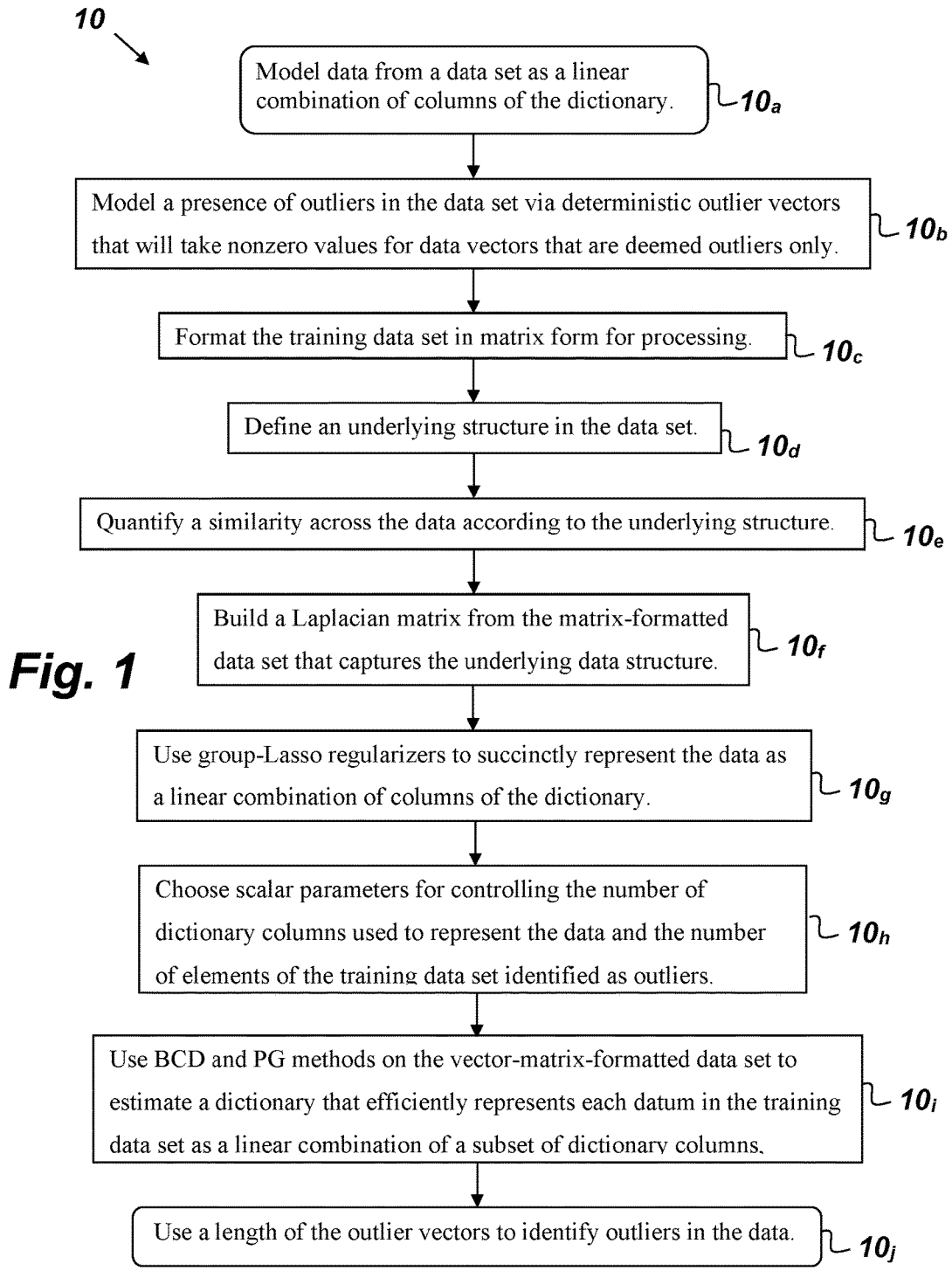
FIG. 1 is a flowchart of a method for constructing a dictionary from a dataset.

FIG. 1 is a flowchart of a method 10 for constructing a dictionary to succinctly represent data from a training data set that comprises, consists of, or consists essentially of the following steps. The first step $10_a$ provides for modeling the data as a linear combination of columns of the dictionary. The next step $10_b$ provides for modeling the presence of outliers in the data set via deterministic outlier vectors, which will take nonzero values for data vectors that are deemed outliers only. The next step $10_c$ provides for formatting the training data set in matrix form for processing. The next step $10_d$ provides for defining an underlying structure in the data set. The next step $10_e$ provides for quantifying a similarity across the data according to the underlying structure. The next step $10_f$ provides for building a Laplacian matrix from the matrix-formatted data set. The underlying data structure is captured within the Laplacian matrix. The next step $10_g$ provides for using Lasso and group-Lasso regularizers to succinctly represent the data as a linear combination of columns of the dictionary. The next step $10_h$ provides for choosing scalar parameters for controlling the number of dictionary columns used to represent the data and the number of elements of the training data set identified as outliers. The next step $10_i$ provides for using block coordinate descent (BCD) and proximal gradient (PG) methods on the vector-matrix-formatted data set to estimate a dictionary that efficiently represents each datum in the training data set as a linear combination of a subset of dictionary columns, corresponding expansion coefficients, and the outlier vectors. The next step $10_j$ provides for using a length of the outlier vectors to identify outliers in the data.

An embodiment of method 10 establishes a universal framework for anomaly detection that does not rely on the statistical distribution of anomalies in the dataset. Once outliers have been identified in a data set, they may be removed from the data set. Then, the outlier-free data set may be used to learn a new dictionary and the corresponding vectors of expansion coefficients via the same BCD and PG methods, with all outlier vectors set to zero.

In a given dataset, outliers alone may be more informative than the remaining data, in which case one would like to quickly identify them and possibly remove them from the dataset. The regularized least-squares (LS) criterion is sensitive to the presence of outliers. Dictionary learning (DL) problem formulations based on the LS cost inherit such sensitivity and are, thus, sensitive to outliers, which can bias the dictionary estimate and reduce the efficiency of DL as a data compression tool.

Instead of using the LS criterion as an error fitting term, robust DL approaches leverage tools developed in the area of robust statistics and use criteria such as the $l_1$-error and the Huber loss to induce robustness to outliers. Unfortunately, previous robust DL approaches do not lend themselves for constructing efficient solvers, and in many cases they do not directly identify the outliers. In an embodiment of dictionary construction method 10, robust analysis methods for data capitalizing on modern signal processing tools is used to leverage a data model that captures the presence of outliers, and the fact that by definition outliers are rare, to develop efficient tools for identifying and tapering the effects of outliers. When there is a structural relationship among elements of the training set, outliers can inherit such a structure. For instance, when training a dictionary using image patches contaminated by outliers, the spatial structure of the patches (size and location) induces a similar structure in the outliers. Dictionary construction method 10 leverages outlier structure to enhance the robustness of the resulting dictionary and to identify outliers. An embodiment of method 10 may be described as a robust DL framework that capitalizes on sparsity-aware modeling tools and the pre-defined structure among outliers. The specific outlier structure may be defined via an undirected graph subsuming the similarity among elements of the training set. This information may be introduced in the robust DL problem via a Laplacian regularization term that now couples all outlier vector representations. A BCD algorithm coupled with PG methods may be used for training the dictionary and identifying the outliers. The data set may be partitioned and vectorised in order to format the data in matrix form. Dictionary construction method 10 uses known structure from the dataset, or application domain, as a means to develop enhanced anomaly detection algorithms applicable to a wide range of signal domains. The methodology is able to capture spatiotemporal structures in the data and deal with datasets that are high dimensional and large.

Consider a training set of M-dimensional real-valued vectors $\mathcal{Y} := \{y_n\}_{n=1}^N$ with cardinality $N := |\mathcal{Y}|$. Let $D := [d_1, \ldots, d_Q] \in \mathbb{R}^{M \times Q}$ denote a dictionary with Q atoms, where an atom corresponds to a column of D. It is assumed that each $y_n$ can be represented as a linear combination of atoms from D. Whenever $Q > M$, D is called overcomplete. If D is overcomplete, vectors $\{d_q\}_{q=1}^Q$ are linearly dependent. Then, the vector of expansion coefficients $s_n$ in $y_n = Ds_n$ is not unique for any n. By requiring each $s_n$ to be sparse, a balance can be stricken between the quality of the approximation and the stability of the representation of each $y_n$.

Given $\mathcal{Y}$, the goal of the classical DL problem is to find both D and $\{s_n\}_{n=1}^N$ as the minimizers of $$\min_{D \in \mathcal{D}, \{s_n\}_{n=1}^N} \frac{1}{2} \sum_{n=1}^N \| y_n - Ds_n \|_2^2 + \eta \sum_{n=1}^N \| s_n \|_1 \qquad (1)$$

where $\mathcal{D} := \{D \in \mathbb{R}^{M \times Q} : \|d_q\|_2 \leq 1, \forall q\}$, $\eta > 0$ is a tuning parameter, and $\|s_n\|_1 := \sum_{q=1}^Q |s_{n,q}|$ represents the $l_1$-norm of $s_n$ with $s_{n,q} := [s_n]_q$. The $l_1$-norm regularizer encourages sparsity on the $s_n$'s and $\eta$ controls the sparsity level of the resulting $s_n$'s. (As used herein, the notation "'s" used after a term such as $s_n$ is meant to indicate plurality.) The constraints on the size of the columns of D defined in $\mathcal{D}$ are necessary to avoid dictionary atoms to grow unbounded and the corresponding entries of each $s_n$ approach zero.

Problem (1) is non-convex and may be solved with a BCD-based solver, which iteratively updates D with $\{s_n\}_{n=1}^N$ fixed, and then updates all $\{s_n\}_{n=1}^N$ with D fixed. This BCD solver solves a constrained LS optimization problem to update the dictionary, and is thus sensitive to the presence of outliers in $\mathcal{Y}$. Note that in the aforementioned BCD solver the updates for the $s_n$'s are also adversely impacted by outliers both through the outlier-sensitive D and the optimization criterion used. Further discussion of a BCD approach is disclosed in M. Elad's article "Sparse and Redundant Representations: From Theory to Applications in Signal and Image Processing," New York: Springer 2010, which article is incorporated by reference herein in its entirety.

The following describes a sparse and structured process for modeling outliers in a dataset. First, a model for each $y_n \in \mathcal{Y}$ that explicitly captures the presence of outliers in the training data set $\mathcal{Y}$ is introduced. To this end, each $y_n \in \mathcal{Y}$ is modeled as $$y_n = Ds_n + o_n + \epsilon_n, n = 1, \ldots, N \qquad (2)$$

where $o_n$ denotes a deterministic outlier vector, and $\epsilon_n$ denotes a inlier noise vector affecting $y_n$. If $y_n$ is an outlier, then $o_n$ takes a nonzero value and lessens the effect of $y_n$ on D; otherwise, $o_n = 0_N$, where $0_N$ is an N×1 vector of zeros. Solving for the tuple (D, $\{s_n, o_n\}_{n=1}^N$) using the set of equations in (2) entails solving a nonlinear and under-determined system of P equations with N(M+Q)+MQ unknowns. Thus, auxiliary information about the structure of each $s_n$ and the $\{o_n\}_{n=1}^N$, and on the proportion of outliers present in $\mathcal{Y}$ becomes essential to obtain a stable estimate for (D, $\{s_n, o_n\}_{n=1}^N$) and avoid over-fitting the model in (2).

The structural information about the outliers may be summarized by an auxiliary weighted graph $\mathcal{G}(V, E)$. The set V defines the vertex set, with cardinality $|V|=N$, where each vertex is associated with an $o_n$. The set E defines the edge set whose elements define the structure of the $o_n$'s and the similarity of each pair of $o_n$'s. The connectivity of $\mathcal{G}$ is compactly summarized by the adjacency matrix $W \in \mathbb{R}^{N \times N}$, where an entry $w_{n,n'} := [W]_{n,n'} > 0$ if nodes $v_n, v_{n'} \in V$ are connected in $\mathcal{G}$, and $w_{n,n'} = 0$ otherwise. The topology of $\mathcal{G}$, and thus the underlying structure associated with the outliers, is encapsulated in the Laplacian matrix $L:=\text{diag}(W1_N)-W$, where $1_N$ denotes an $N\times 1$ vector of ones and $\text{diag}(y_n)$ a diagonal matrix with $y_n$ on its main diagonal. Note that $\mathcal{G}$ does not have to be connected.

Usually DL seeks sparse expansion coefficient vectors $\{s_n\}_{n=1}^N$. Moreover, outliers by definition are rare and, thus, few of them are assumed to be present in $\mathcal{Y}$. The sparse presence of outliers in equation (2) can be quantified through the support of the vector $[\|o_1\|_2, \ldots, \|o_N\|_2]$. Let $O:=[o_1, \ldots, o_N]\in \mathbb{R}^{Q\times N}$ denote a matrix of outlier vectors, $S:=[s_1, \ldots, s_N]\in \mathbb{R}^{Q\times N}$ a matrix of expansion coefficient vectors, and $\|O\|_{2,p}:=\|[\|o_1\|_2, \ldots, \|o_N\|_2]\|_p$, where $\|o_n\|_p := (\sum_{m=1}^M |o_{m,n}|^p)^{1/p}$ represents the $l_p$-norm of $o_n$ with $o_{m,n}:=[o_n]_m$ and $p\in[1,\infty)$. An estimator for (D, S, O) that captures the spatial structure of the outliers is given by the solution of $$\min_{D\in\mathcal{D},S,O} \frac{1}{2}\sum_{n=1}^N \|y_n - Ds_n - o_n\|_2^2 + \eta\sum_{n=1}^N \|s_n\|_1 + \lambda \|O\|_{2,1} + \frac{\mu}{2}Tr(OLO') \quad (3)$$

where $Tr(\bullet)$ denotes the matrix trace operator, $\eta>0$ is a tuning parameter that controls the sparsity of the $s_n$'s $\lambda>0$ a tuning parameter that controls the number vectors in $\mathcal{Y}$ identified as outliers, and $\mu>0$ a tuning parameter that controls how much emphasis is placed on the structural relation among outliers. The group Lasso regularizer in equation (3) encourages entire $o_n$ vectors to be set to zero. The Laplacian regularization term in equation (3) can be explicitly written as $$Tr(OLO') = \frac{1}{2}\sum_{m=1}^M \left[\sum_{n=1}^N \sum_{n'=1}^N w_{n,n'}(o_{m,n} - o_{m,n'})^2\right]. \quad (4)$$

From equation (4), it follows that the Laplacian regularization term in equation (3) encourages $o_n$'s to be similar to each other if they are connected in $\mathcal{G}$.

In general, equation (3) is a non convex optimization problem which is difficult to solve. Nevertheless, when optimizing with respect to any one of D, S, and O with the other two fixed, the resulting optimization problems can be solved efficiently. DL-alternate formulations that rely on a constrained version of equation (3), where the $l_0$-"norm" is used in lieu of the $f_j$-norm, and bestow structure on the dictionary's atoms may be used. There are no general rules for choosing between any of these DL formulations and the selection often depends on the specific problem at hand. Our outlier model in equation (2) and the Laplacian regularizer in equation (4) can be used to develop robust versions of these DL approaches. The resulting robust and structure DL approaches are able to capture the underlying structure of the outliers after appropriately modifying the algorithmic framework outlined next.

The following algorithm is an embodiment of a BCD solver for equation (3). This embodiment capitalizes on the observation that efficient solvers may be realized for updating one of D, S, or O when the other two optimization variables are fixed. Equation (3) is convex with respect to D and O individually. With f(D, S, O) denoting the objective function in equation (3), the proposed BCD algorithm minimizes f(D, S, O) with respect to each optimization block, namely D, S, or O, one at a time. Let k denote the BCD-iteration index. Our robust DL algorithm is summarized by the following iterations:

$$\hat{D}^{(k)} = \underset{D\in\mathcal{D}}{\arg\min}\, f(D, \hat{S}^{(k-1)}, \hat{O}^{(k-1)}) \quad (6a)$$

$$\hat{S}^{(k)} = \underset{S}{\arg\min}\, f(\hat{D}^{(k)}, S, \hat{O}^{(k-1)}) \quad (6b)$$

$$\hat{O}^{(k)} = \underset{O}{\arg\min}\, f(\hat{D}^{(k)}, \hat{S}^{(k)}, O) \quad (6c)$$

where $\hat{D}^{(k)}$, $\hat{S}^{(k)}$, and $\hat{O}^{(k)}$ denote estimates for D, S, and O at iteration k, respectively.

---

Algorithm 1 BCD algorithm for dictionary update in (6a)

Require: y and tuple $(\hat{D}^{(k-1)}, \hat{S}^{(k-1)}, \hat{O}^{(k-1)})$.
1:   Let $D^{(v)} := [d_1^{(v)}, \ldots, d_Q^{(v)}]$ and $\hat{s}_{q,n}^{(k-1)} := [\hat{S}^{(k-1)}]_{q,n}$.
2:   Use $v$ as BCD iteration index and set $D^{(0)} = \hat{D}^{(k-1)}$.
3:   for = 1, 2, ..., $\gamma$ do
4:     for q = 1, ..., Q do
5:       Update each atom in $D^{(v)}$ as $$r_{q,n}^{(v,k-1)} = y_n - o_n^{(k-1)} - \sum_{\substack{q'=1 \\ q'\neq q}}^Q \hat{s}_{q',n}^{(k-1)} d_{q'}^{(v-1)} \quad (5a)$$

$$u_q^{(v)} = \left[\sum_{n=1}^N (\hat{s}_{q,n}^{(k-1)})^2\right]^{-1}\left[\sum_{n=1}^N \hat{s}_{q,n}^{(k-1)} r_{q,n}^{(v,k-1)}\right] \quad (5b)$$

$$d_q^{(v)} = \frac{u_q^{(v)}}{\min\{1, \|u_q^{(v)}\|_2\}} \quad (5c)$$

6:     end for
7:   end for
8:   return $\hat{D}^{(k)} = D^{(\gamma)}$.

---

Updating $D^{(k)}$ in (6a) may be done via a BCD algorithm iterating over the columns of D. Per BCD iteration, each atom of D is updated with all other atoms fixed by solving the resulting unconstrained LS optimization problem. This BCD algorithm is summarized as Algorithm 1 above. Note that for (5b) to be well-defined, each atom in $\hat{D}^{(k-1)}$ must be used by at least one $s_n$. In practice, every unused atom of the dictionary is updated to a randomly chosen element of $\mathcal{Y}$ in before running Algorithm 1 and (5b) is skipped for such an atom when updating the dictionary. If there are no unused atoms, Algorithm 1 is guaranteed to achieve the minimum of the cost in (6a).

The update in (6b) decouples per column of S. The resulting set of optimization problems are convex and correspond to the Lagrangian version of the least-absolute shrinkage and selection operator, such as is described in R. Tibshirani's article "Regression shrinkage and selection via the lasso" (Journal of the Royal Statistical Society, 1996. These optimization problems can be efficiently solved via, e.g., BCD or an alternating direction method of multipliers, such as is described by M. Elad in the article "Sparse and Redundant Representation: From Theory to Applications in Signal and Image Processing", 2010 and by D. P. Bertsekas in the article "Nonlinear Programming, 1999. The update in (6c) entails solving a convex optimization problem. However, tackling (6c) in its current form leads to solvers whose computational complexity can be high due to the coupling across $o_n$'s caused by the Laplacian regularizer.

Equation (6c) may be solved via a PG algorithm such as Algorithm 2, which is shown below.

---

Algorithm 2 PG algorithm for solving (6c)

---

Require: y, $(\hat{D}^{(k)}, \hat{S}^{(k)}, \check{O}^{(k-1)})$, and $\mu, \lambda, \Lambda > 0$.
1:     Let $O^{(\tau)} := [o_1^{(\tau)}, \ldots, o_N^{(\tau)}]$.
2:     Use $\tau$ as PG iteration index and set $O^{(1)} = \hat{O}^{(k-1)}$.
3:     for $\tau = 1,2,\ldots,T$ do
4:         for $n = 1,\ldots,N$ do
5:             Compute $\omega_n(O^{(\tau)})$ via (7a).
6:             Compute $h_n(O^{(\tau)})$ via (7b).
7:             Update $o_n^{(\tau)}$ via (9).
8:         end for
9:     end for
10:    return $\hat{O}^{(k)} = O^{(T)}$.

---

Although the resulting solver (i.e., Algorithm 2) for (6c) is iterative in nature, it features fast convergence when compared to other first order optimization methods such as gradient descent and BCD. Moreover, the updates are decomposable across each $o_n$. Hence, they can be parallelized. The PG algorithm 2 for updating (6c) at iteration k relies on the following:

$$\omega_n(O^{(\tau)}) := -\left(y_n - \hat{D}^{(k)}\hat{s}_n^{(k)} - o_n^{(\tau)}\right) + \mu O^{(\tau)} a_n \quad (7a)$$

$$h_n^{(k)}(O^{(\tau)}) := o_n^{(\tau)} - \frac{w_n^{(k)}(O^{(\tau)})}{\Lambda} \quad (7b)$$

$$g^{(k)}(O; O^{(\tau-1)}) := \sum_{n=1}^{N} \left[\frac{1}{2} \|o_n - h_n^{(k)}(O^{(\tau-1)})\|_2^2 + \frac{\lambda}{\Lambda} \|o_n\|_2\right] \quad (7c)$$

where $\tau$ denotes the proximal method iteration index, $\omega_n(O^{(\tau)})$ denotes the gradient of the differentiable part of f with respect to $o_n$ evaluated at $O^{(\tau)}$, $a_n$ the n-th column of L, and $\Lambda$ the Lipschitz constant for the gradient (with respect to O) of the differentiable part of f, which corresponds to the largest singular value of I+μL. Our iterative update for computing (6c) is summarized as follows:

$$O^{(\tau)} = \underset{O}{\arg\min} \, g^{(k)}(O; O^{(\tau-1)}). \quad (8)$$

This update is separable across $o_n$'s. Computing each $o_n^{(\tau)}$ is then done in closed form as $$o_n^{(\tau)} = h_n^{(k)}(O^{(\tau-1)})\left(1 - \frac{\lambda}{\Lambda \|h_n^{(k)}(O^{(\tau-1)})\|_2}\right)_+$$

where $(\bullet)_+ := \max\{0, \bullet\}$. Note that $1/\Lambda$ in (9) can be understood as the step size $\alpha$ of the PG algorithm. From this vantage point, the PG algorithm will converge for any $$\alpha \in \left(\frac{0, 1}{\Lambda}\right].$$

It is also possible to choose $\alpha$ at each PG iteration via a line search, such as is known in the art and described in more detail in N. Parikh's and S. Boyd's article "Proximal algorithms," in "Found. Trends Optimization, vol. 1, pp. 123-231, 2013.

The PG algorithm for solving (6c) may be summarized as Algorithm 2. Each iteration of this PG algorithm can be computed in O (MNQ+MN$^2$) run time, where the quadratic dependency on N stems from the second term in (7a) that defines an operation to be performed for each n. The computational complexity of Algorithm 2 can be reduced after noticing that $O^{(\tau)}$ is a sparse matrix and often L is a sparse matrix as well. In this case, specialized sparse matrix multiplication algorithms may be used to reduce the run time of (7a) for each n. The PG method outlined by Algorithm 2 converges to the solution of (6c) and features a worst-case convergence rate of $O(1/\tau)$.

It is possible to enhance the suboptimal convergence rate of the PG algorithms while maintaining their computational simplicity. From that vantage point, one may develop an accelerated PG (APG) algorithm for solving (6c) which features worst-case convergence rate of $O(1/\tau^2)$ to the solution of (6c). The resulting APG solver requires a copy of both $O^{(\tau)}$ and $O^{(\tau-1)}$. Maintaining a copy of $O^{(\tau-1)}$ does not add excessive data storage requirements since $O^{(\tau-1)}$ is column-wise sparse. Similarly to the PG algorithm, each iteration of the APG algorithm can be computed in O (MNQ+MN$^2$) run time and benefits from specialized sparse matrix multiplication algorithms for updating each $\omega_n$.

Figure 2:
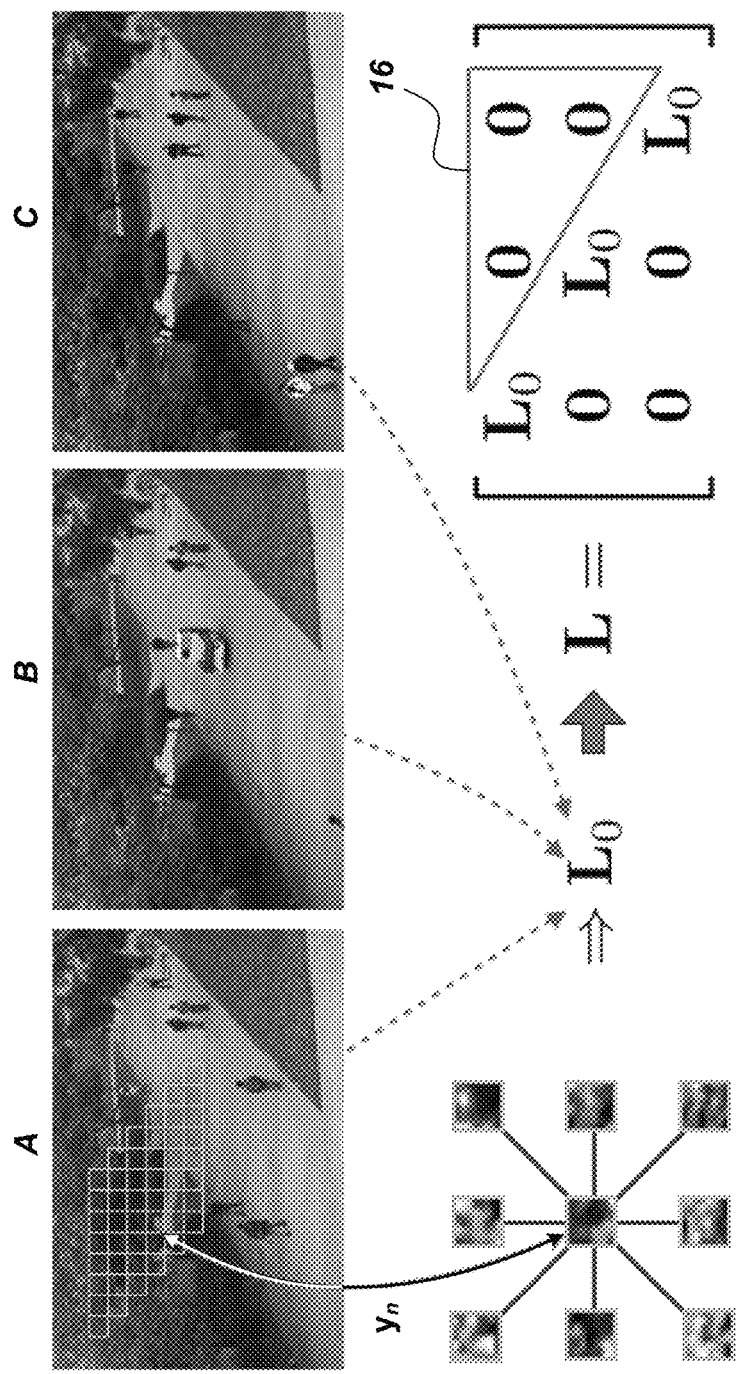
FIG. 2 shows three images of a walkway and illustrates a spatial structure captured in a matrix.

FIG. 2 is an illustration of a video imagery dataset on which the robust DL algorithm defined in equations 6(a)-6(c) was tested. The three still images in FIG. 2 were taken from The University of California San Diego's (UCSD's) Anomaly Detection Dataset. Each image was partitioned to multiple blocks and their relative position with respect to each other was used to define an auxiliary graph whose structure is captured by the Laplacian matrix $L_O$. This spatial structure is illustrated for the n-th block, which is identified as $y_n$ in FIG. 2, is illustrated on the left side of FIG. 2. The Laplacian matrix L that captures the structure of the entire dataset $\mathcal{Y}$ is illustrated on the right side of FIG. 2, where 0 denotes a 551×551 matrix of zeros. The portion of L enclosed by the triangle 16 underscores the fact that L does not capture block structures across images.

The numerical performance of the robust DL algorithm defined in 6(a)-6(c) was tested via numerical tests on two real datasets: UCSD's Anomaly Detection Dataset and on the Resampled United States Postal Service (USPS) dataset. For these tests all algorithms used in this embodiment of method 10 were implemented in Python™ 2.7, which is a high-level, object oriented programming language created by Guido van possum and offered by The Python Foundation. The UCSD Anomaly Detection Dataset data set features video of a pedestrian walkway acquired with a stationary camera and a fixed background. With few exceptions, most portions of the video contain only pedestrians moving along the walkway. Abnormal events include the presence of bikers, skates and small carts. Three images from this dataset were used for this test. (See images A, B, and C shown in FIG. 2) Each image in FIG. 2 was chosen so that the crowd density in the image was low. No artificial anomalies were introduced in these images. Note that one of the images (image B) shows a service cart passing by.

Each image was resized from 158×258 pixels to 152×252 and then partitioned into 8×8 pixel blocks. The resulting N=1,653 blocks (551 per image), were used to construct $\mathcal{Y} \subset \mathbb{R}$ with M=64. Each 64-dimensional $y_n = \mathcal{Y}$ was constructed by vertically stacking the columns of each block. In this test, no further preprocessing was performed on the elements of the training set. In order to capture the spatial structure among blocks per image, an auxiliary graph with $N_0=551$ nodes was constructed as follows. Each $y_n$ was assigned to a node of the graph. The edges for each node were chosen so that each $y_n$ is connected to its spatial neighboring blocks only, as shown in FIG. 2, and their corresponding weights were set to unity. Thus, in the resulting graph the degree of each node is either 3 for corner blocks, 5 for border blocks that are not corners, and 8 for all other ones. The connectivity of the graph is summarized by the Laplacian matrix $L_0$. Finally, L was defined as a block diagonal matrix containing three copies of $L_0$ on its main block diagonal (see FIG. 2) Note that L does not capture block structures across images. With the current form of L, in this embodiment, method 10 does not rely on any form of temporal information. Such temporal information can, however, be included on the off-diagonal entries of L.

Figure 3:
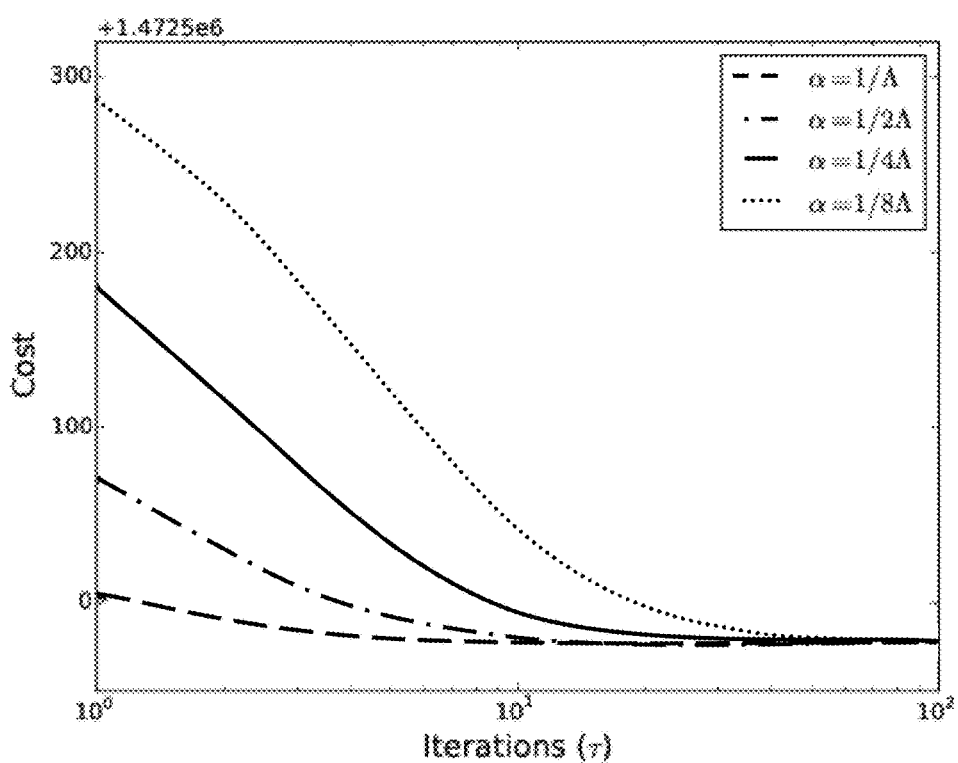
FIG. 3 is a graph of cost data vs. iterations during execution of an algorithm.
Figure 4:
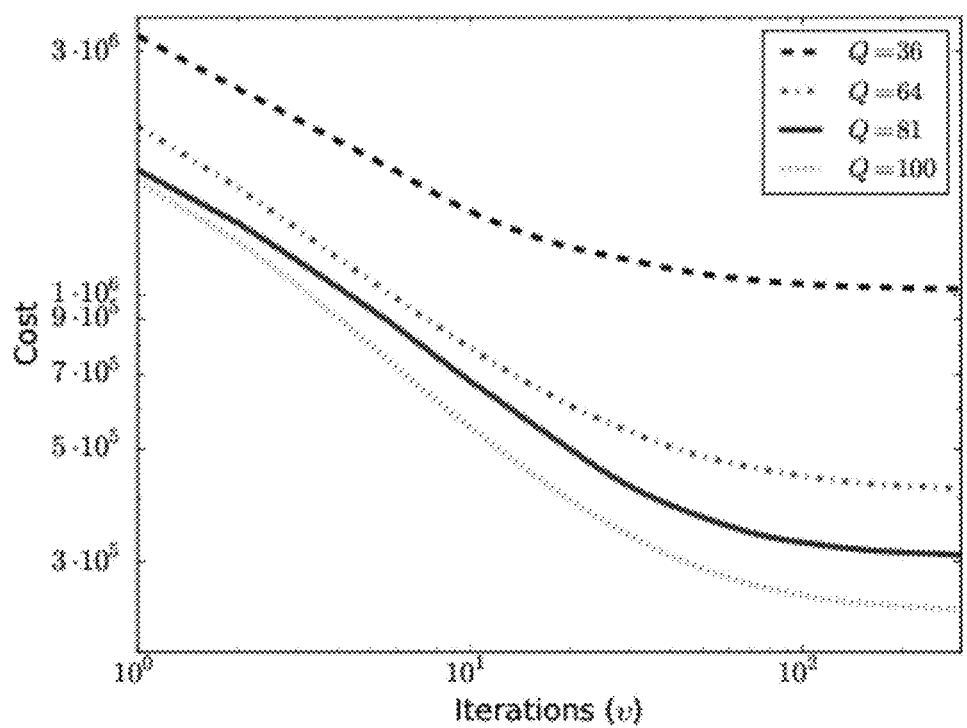
FIG. 4 is a graph of cost data vs. iterations during execution of an algorithm.

FIG. 3 is a graph showing the cost in equation (3) during the execution of equation (6c) via Algorithm 2. FIG. 4 is a graph showing the cost in equation (3) during the execution of the robust DL algorithm defined by equations 6(a)-6(c). In FIG. 3, which shows the evolution of the cost in equation (3) when updating O via Algorithm 2, the curves were obtained for an early BCD iteration of 6(a)-6(c) and various choices of step size α. Note that the convergence rate of Algorithm 2 was not significantly impacted by the choice of μ. FIG. 4 shows the evolution of the cost in equation (3) during the execution of the BCD algorithm in 6(a)-6(c) for various values of the dictionary size Q.

Referring back to FIG. 3, for illustration purposes only, we used a modified version of Algorithm 2 where a tunable step size α was used in lieu of the factor 1/Λ. The PG algorithm will converge for any $$\alpha \in \left(\frac{0, 1}{\Lambda}\right].$$

However, the best convergence rate is achieved by setting $\alpha=1/\Lambda$ as in Algorithm 2. In practice it was observed that during the first iteration of the BCD algorithm the PG algorithm took less than 20 iterations. As the BCD iterations progressed, the average number of PG iterations required for convergence decreased to around 3-5. FIG. 4 illustrates the convergence rate of the BCD algorithm defined by the updates in 6(a)-6(c) for various values of Q.

FIGS. 5A-5F show blocks of pixels identified as outliers in the images shown in FIG. 2. FIGS. 5A-5C were obtained by setting (λ, μ)=(37.5, 0). In FIGS. 5A-5C, 191 blocks (approximately 12% of the training blocks) were identified as outliers and on average 57% of the entries of each $s_n$ were set to zero. FIGS. 5D-5F were obtained by setting (λ, μ)=(36.0, 10). In this case, 207 blocks (approximately 12.5% of the training blocks) were identified as outliers and on average 55% of the entries of each $s_n$ were set to zero. For this experiment, a dictionary with Q=64 atoms was used. Parameter η was set to η=3.7 so that on average 36 nonzero entries were chosen for each $s_n$. Some of the blocks identified as outliers correspond to the portions of the images displaying pedestrians and the service cart.

It was observed that setting μ>0 encouraged outlier blocks to be chosen according to the structure defined by the matrix L. For instance, in FIG. 5E the outlier blocks corresponding to some of the pedestrians seem to follow more rigidly the spatial structure defined for the elements of $\mathcal{Y}$. Finally, although not easily seen in FIGS. 5A-5F, several blocks corresponding to the foliage in the background are picked up as outliers. This can in part be due to the texture richness inherent to foliage and other natural texture images. Using a dictionary with Q>64 and temporal information in L can help alleviate the sensitivity of method 10 to the background texture diversity.

Figure 6:
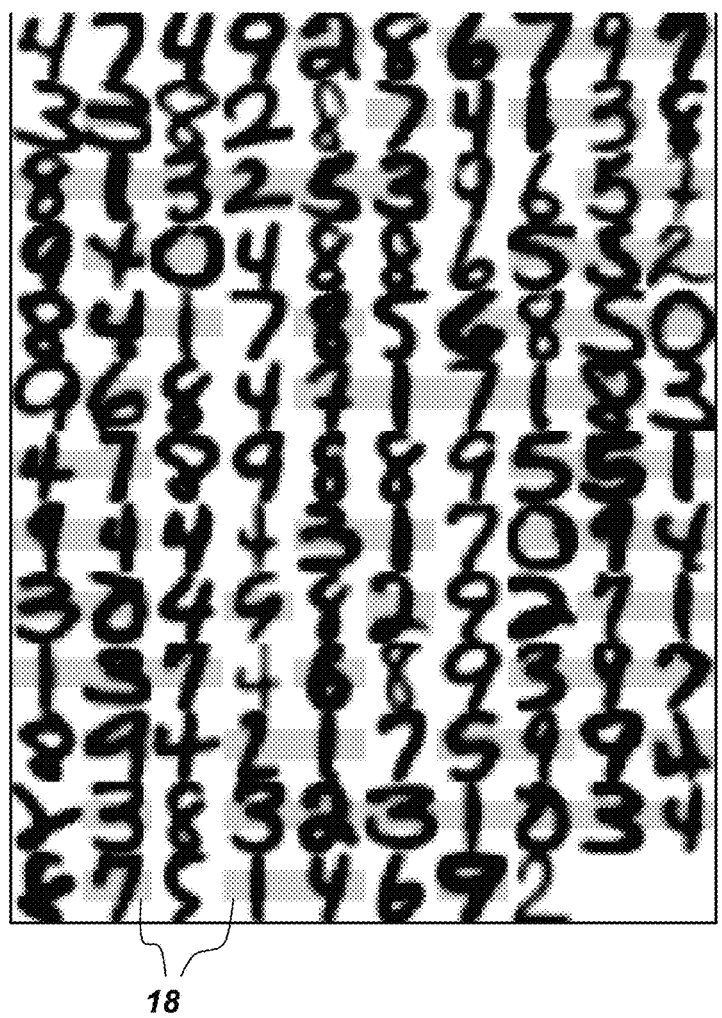
FIG. 6 is an illustration highlighting digits that were deemed to be outliers in a training data set.

FIG. 6 illustrates the results obtained when using the robust DL algorithm for learning a dictionary with the Resampled USPS dataset and artificially-introduced outliers. The USPS resampled data set is a randomly shuffled version of the USPS handwritten numeral digital data, which had many more training digits than testing digits. This dataset includes 4,696 16×16 training digits, which are stored as 256-dimensional column vectors whose entries range over the interval [−1, 1]. In this test, N=1,000 digits were used for training and artificial anomalies were introduced by coloring a fraction of randomly chosen digits. In order to emulate the red, green, blue (RGB) model for each digit, three copies of each training digit were created, one for each channel of the RGB color model. Per digit, each RGB-color-channel image was vectorized and vertically stacked to form a 768×1 training vector $y_n \in \mathcal{Y}$. In FIG. 6, the digits that were identified by method 10 as being anomalies are highlighted with grey bars 18. The artificially-injected anomalies were detected using the robust DL algorithm with parameters λ=1.025, μ=480, and K=100.

The goal of the USPS test was to find the injected anomalies along with other "odd" looking digits in $\mathcal{Y}$. The size of the dictionary was set to Q=100 and it was initialized with randomly chosen elements from $\mathcal{Y}$. The spatial structure of the digits was captured via an auxiliary graph with N=1,000 nodes. For each node, the Cosine similarities between its image and all other images corresponding to all other nodes were computed. Per node n, a set of K weighted edges was added to the graph, where the chosen edges corresponded to the node pairs $\{(n, m)\}_{m \neq n}$ with the K-largest similarity score. In this experiment, the constrained DL formulation that uses the $l_0$-"norm" was used in lieu of equation (3). Thus, the solvers used for (6a) and (6b) were modified accordingly. Specifically, orthogonal matching pursuit (OMP) was used to solve (6b) and the constrained set $\mathcal{D}$ was dropped from (6a). The desired set of nonzero coefficients used by OMP was set to $S_0=40$.

Figure 7:
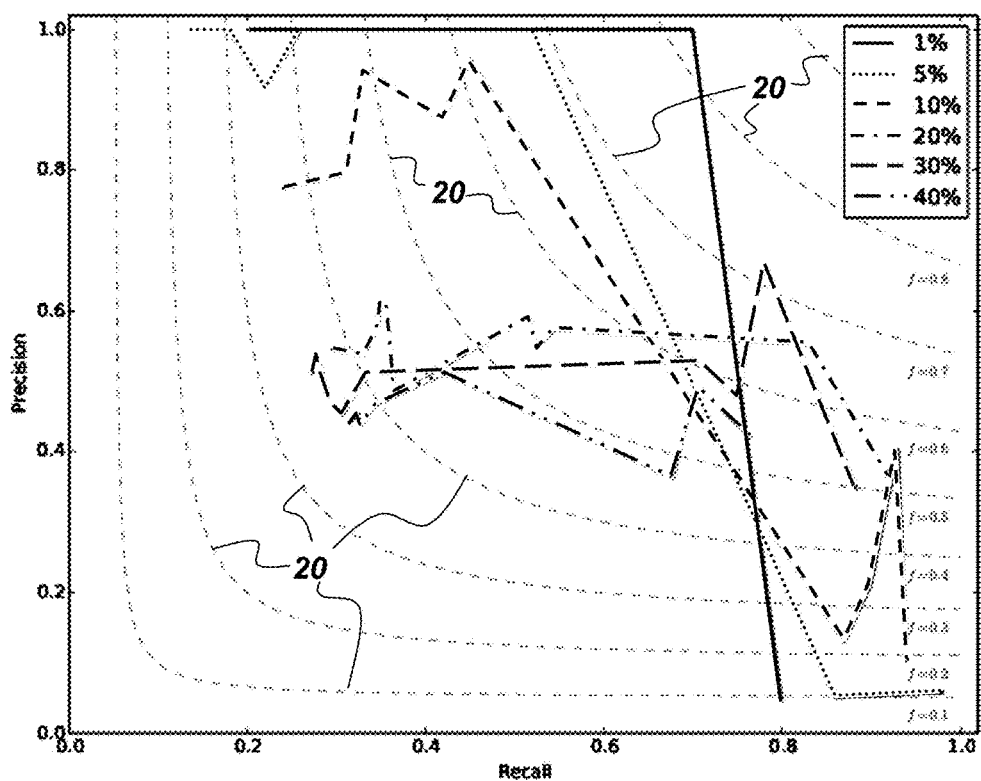
FIG. 7 is a graph showing Precision-Recall curves.

FIG. 7 is a graph showing Precision-Recall curves obtained by the robust DL algorithm on the USPS dataset with manually-injected color anomalies. Dashed light-grey lines 20 denote the isolevel lines for various F-score levels, which is defined as the harmonic mean of the precision and recall scores, indexed by f. Various percentages of anomalous images ranging from 1% to 40% were injected into the USPS training set. The parameters λ, μ, and K were tuned so as to try to find all the artificially-added anomalous digits. FIG. 7 shows Precision-Recall curves for the various percentages of injected anomalies. These curves show that precision scores are higher for a broad range of recall scores when a smaller percentage of anomalies are injected. An example of the anomalies detected is shown in FIG. 6. In the instant case, 100 images were colored (10% anomalies injected) and 78 were correctly identified yielding a precision score of 78.00% and recall score of 60.94%.

Dictionary construction method 10 utilizes a robust DL algorithm that leverages known structure among the elements of the training set. The training set structure may be summarized by an auxiliary graph whose connectivity is defined according to the similarity between elements of the training set. Dictionary construction method 10 further uses a BCD solver to learning the dictionary and to identify the outliers. The outlier variables may be updated with a PG algorithm as part of the aforementioned BCD solver. In addition to being applied to images, the method 10 can be applied to other signal domains including video (full motion video, motion imagery, etc.), computer and sensor networks (traffic flows, information flows), social networks, text data, active and passive sonar, audio, etc. Method 10's ability to construct a dictionary from a dataset that includes outliers/anomalies will allow a computer to extract actionable information from a data set faster than previous methods while simultaneously reducing the storage and communications requirements related to sharing and archiving the data.

From the above description of the dictionary construction method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A computer-implemented method for constructing a dictionary to succinctly represent data from a training data set comprising the steps of:
    modeling the data as a linear combination of columns of the dictionary;
    modeling a presence of outliers in the data set via deterministic outlier vectors that will take nonzero values for data vectors that are deemed outliers only;
    formatting the training data set in matrix form for processing;
    defining an underlying structure in the data set;
    quantifying a similarity across the data according to the underlying structure;
    building a Laplacian matrix from the matrix-formatted data set, wherein the underlying data structure is captured within the Laplacian matrix;
    using group-Lasso regularizers to succinctly represent the data as a linear combination of columns of the dictionary;
    choosing scalar parameters for controlling the number of dictionary columns used to represent the data and the number of elements of the training data set identified as outliers;
    using block coordinate descent (BCD) and proximal gradient (PG) methods on the vector-matrix-formatted data set to estimate a dictionary that efficiently represents each datum in the training data set as a linear combination of a subset of dictionary columns, corresponding expansion coefficients, and the outlier vectors;
    using a length of the outlier vectors to identify outliers in the data;
    removing data identified as outliers from the data set; and
    using the outlier-free dataset to learn a new dictionary and corresponding vectors of expansion coefficients via the BCD and PG methods with all outlier vectors set to zero.

2. The method of claim 1, wherein the underlying structure describes a spatiotemporal relationship among data points.

3. The method of claim 1, wherein the step of formatting the data set in matrix form for processing comprises partitioning and vectorizing the data.

4. The method of claim 1, wherein the data is video data.

5. The method of claim 1, wherein the data is imagery data.

6. The method of claim 1, wherein the data is acoustic data.

7. The method of claim 1, wherein the data is text data.

8. The method of claim 1, wherein the data is social network postings.

9. The method of claim 1, wherein the Laplacian regularizer is defined by the equation:

$$Tr(OLO') = \frac{1}{2}\sum_{m=1}^{M}\left[\sum_{n=1}^{N}\sum_{n'=1}^{N} w_{n,n'}(o_{m,n} - o_{m,n'})^2\right]$$

where Tr is the trace operator, M is the dimensionality of the training dataset, m is an index ranging between 1 and M, N is the number elements in the training data set,
n is an index ranging between 1 and N, n' is an index ranging between 1 and N, $o_{m,n}$ is the m-th entry of the n-th outlier vector, $w_{n,n'}$ is a non-negative weight corresponding to the similarity between the m-th and the n'-th elements of the data set, O is a matrix of outlier vectors, O' is the transpose of the matrix of outlier vectors, and
L is the Laplacian matrix.

10. The method of claim 9, wherein the BCD and PG methods used on the vector-matrix-formatted data set is defined as:

$$\min_{D\in\mathcal{D},S,O} \frac{1}{2}\sum_{n=1}^{N} \|y_n - Ds_n - o_n\|_2^2 + \eta\sum_{n=1}^{N}\|s_n\|_1 + \lambda\|O\|_{2,1} + \frac{\mu}{2}Tr(OLO')$$

where $\mathcal{D}$ is the constraint set for the dictionary, D is the dictionary, S is the matrix of expansion coefficients, $s_n$ is the vector of expansion coefficients corresponding to the n-th element of the training set, $y_n$ is the n-th element of the training data set, $o_n$ is the outlier vector corresponding to the n-th element of the training data set, η is a positive tuning parameter, λ is a positive tuning parameter, and μ is a positive tuning parameter.

11. The method of claim 1, wherein a plurality of similarities are quantified across the data according to the underlying structure.

12. The method of claim 10, wherein information regarding the underlying structure is introduced via a robust dictionary learning (DL) algorithm represented by the following iterations:

$$\hat{D}^{(k)} = \underset{D\in\mathcal{D}}{\arg\min} f(D, \hat{S}^{(k-1)}, \hat{O}^{(k-1)})$$

$$\hat{S}^{(k)} = \underset{S}{\arg\min} f(\hat{D}^{(k)}, S, \hat{O}^{(k-1)})$$

$$\hat{O}^{(k)} = \underset{O}{\arg\min} f(\hat{D}^{(k)}, \hat{S}^{(k)}, O)$$

where k denotes a BCD-iteration index, and $\hat{D}^{(k)}$, $\hat{S}^{(k)}$, and $\hat{O}^{(k)}$ denote estimates for D, S, and O at iteration k, respectively.

13. A method for constructing a learned dictionary with a computer to succinctly represent data from a training data set comprising the steps of:

utilizing a robust dictionary learning (DL) framework that capitalizes on sparsity-aware modeling tools and a predefined structure among outliers in the data set, wherein the specific outlier structure may be defined via an undirected graph subsuming the similarity among elements of the training data set;

introducing information about the outlier structure into the DL framework via a Laplacian regularization term that couples all outlier vector representations;

partitioning and vectorizing the training data set in order to format the data in matrix form;

using a block coordinate descent (BCD) algorithm coupled with proximal gradient (PG) methods to train the dictionary, estimate corresponding expansion coefficients, and identify the outliers;

removing data identified as outliers from the data set; and using the outlier-free dataset to learn a new dictionary and corresponding vectors of expansion coefficients via the BCD and PG methods with all outlier vectors set to zero.

14. The method of claim 13, wherein the BCD algorithm and PG methods used on the vector-matrix-formatted data set is defined as:

$$\min_{D \in \mathcal{D}, S, O} \frac{1}{2} \sum_{n=1}^{N} \| y_n - D s_n - o_n \|_2^2 + \eta \sum_{n=1}^{N} \| s_n \|_1 + \lambda \| O \|_{2,1} + \frac{\mu}{2} Tr(OLO')$$

where $\mathcal{D}$ is the constraint set for the dictionary, D is the dictionary, S is the matrix of expansion coefficients, O is a matrix of outlier vectors, $s_n$ is the vector of expansion coefficients corresponding to the n-th element of the training set, $y_n$ is the n-th element of the training data set, $o_n$ is the outlier vector corresponding to the n-th element of the training data set, η is a positive tuning parameter, λ is a positive tuning parameter, μ is a positive tuning parameter, and Tr is the trace operator, N is the number elements in the training data set, n is an index ranging between 1 and N, O' is a transpose of the matric of outlier vectors, and L is the Laplacian matrix.

15. The method of claim 14, wherein information regarding the underlying structure is introduced via a robust DL algorithm represented by the following iterations:

$$\hat{D}^{(k)} = \underset{D \in \mathcal{D}}{\arg\min} \, f\left(D, \hat{S}^{(k-1)}, \hat{O}^{(k-1)}\right)$$

$$\hat{S}^{(k)} = \underset{S}{\arg\min} \, f\left(\hat{D}^{(k)}, S, \hat{O}^{(k-1)}\right)$$

$$\hat{O}^{(k)} = \underset{O}{\arg\min} \, f\left(\hat{D}^{(k)}, \hat{S}^{(k)}, O\right)$$

where k denotes a BCD-iteration index, and $\hat{D}^{(k)}$, $\hat{S}^{(k)}$, and $\hat{O}^{(k)}$ denote estimates for D, S, and O at iteration k, respectively.

* * * * *